US008589311B2

(12) United States Patent
Bhatt et al.

(10) Patent No.: US 8,589,311 B2
(45) Date of Patent: Nov. 19, 2013

(54) DESIGNING BUSINESS CONTENT FOR REPORTING

(75) Inventors: Ankur Bhatt, Bangalore (IN); Raghunandan Sarangarajan, Bangalore (IN)

(73) Assignee: SAP Aktiengesellschaft, Walldorf (DE)

( * ) Notice: Subject to any disclaimer, the term of this patent is extended or adjusted under 35 U.S.C. 154(b) by 2641 days.

(21) Appl. No.: 10/648,108

(22) Filed: Aug. 26, 2003

(65) Prior Publication Data

US 2004/0252134 A1    Dec. 16, 2004

Related U.S. Application Data

(60) Provisional application No. 60/478,255, filed on Jun. 13, 2003.

(51) Int. Cl.
*G06Q 10/00* (2012.01)

(52) U.S. Cl.
USPC .......................................... 705/342

(58) Field of Classification Search
USPC ...................................... 705/1, 342
See application file for complete search history.

(56) References Cited

U.S. PATENT DOCUMENTS

| | | | |
|---|---|---|---|
| 5,894,311 | A | 4/1999 | Jackson |
| 6,031,625 | A | 2/2000 | Sherman et al. |
| 6,151,624 | A | 11/2000 | Teare et al. |
| 6,332,163 | B1 | 12/2001 | Bowman-Amuah |
| 6,615,253 | B1 | 9/2003 | Bowman-Amuah |
| 6,629,081 | B1 | 9/2003 | Cornelius et al. |
| 6,668,253 | B1 * | 12/2003 | Thompson et al. ............. 707/10 |
| 6,901,403 | B1 * | 5/2005 | Bata et al. ..................... 707/101 |
| 6,920,608 | B1 | 7/2005 | Davis |
| 7,062,502 | B1 * | 6/2006 | Kesler .................................. 1/1 |
| 2002/0152189 | A1 | 10/2002 | Crim |
| 2003/0023670 | A1 | 1/2003 | Walrath |
| 2003/0046209 | A1 | 3/2003 | Brandenberger et al. |
| 2003/0126136 | A1 | 7/2003 | Omoigui |
| 2004/0252121 | A1 | 12/2004 | Bhatt et al. |
| 2004/0252136 | A1 | 12/2004 | Bhatt et al. |
| 2004/0255239 | A1 | 12/2004 | Bhatt et al. |
| 2005/0080757 | A1 | 4/2005 | Sharma et al. |

FOREIGN PATENT DOCUMENTS

CA    2151654    12/1996

OTHER PUBLICATIONS

Sams Teach Yourself Microsoft Access 2000; Craig Eddy and Timothy Buchanan; Sams Publishing; May 1999; pp. 201-214.*

(Continued)

*Primary Examiner* — Carrie Gilkey
(74) *Attorney, Agent, or Firm* — Fish & Richardson P.C.

(57) ABSTRACT

Techniques are disclosed for designing business content for reporting tools. In one general aspect, the invention provides for receiving a user selection of a business object having associated attributes and displaying a view of the attributes. A user selection of one or more of the attributes is received, indicating the selected one or more attributes are to be displayed in a report generated in the external reporting application. The selected one or more attributes are added to a business content structure. Data associated with the business content structure is retrieved and an output file is generated. The reporting application can use the output file to generate the report that includes the business content structure and the data associated therewith. The business content structure can be stored in a database and later retrieved to generate an output file, allowing a report with current data to be generated by the reporting application.

27 Claims, 9 Drawing Sheets

(56) References Cited

OTHER PUBLICATIONS

"Utilizing OLE in Office XP/2000" *Create for Mississippi*, retrieved from the Internet on Oct. 14, 2004 at http://www.create.cett.msstate.edu/create/howto/ole.pdf>, document dated Aug. 2001, 7 pages.

"StarOffice™ 6.0 Office Suite", *Sun Microsystems*, retrieved from the Internet on Oct. 14, 2004 at http://www.sun.com/products-n-solutions/edu/success/pdf/Star_Office_6.0.pdf>, document undated, 6 pages.

"Diagra™ Graphics Server" *ReportLab Europe Ltd.*, retrieved from the Internet on Oct. 14, 2004 at http://www.reportlab.com/docs/diagra-ds.pdf>, document dated Jan. 2003, 5 pages.

"Web-Enabled Business Reporting," *Ernst & Young LLP and Morgan Stanley*, document dated Sep. 20, 2002, obtained from the Internet on Sep. 29, 2004 at http://www.ey.com/global/download.nsf/International/WBR_Sept02_Whitepaper.pdf>, 12 pages.

"e.Report Option," *Actuate*, document dated 2002, obtained from the Internet on Sep. 29, 2004 at http://www.actuate.com/download/A8ereportoption.pdf>, 7 pages.

"Announcing the New Datawatch/ES 4.0 Enterprise Reporting Solution," *The Monarch Report*, Feb. 2003, obtained from the Internet on Sep. 29, 2004 at http://www.datawatch.com/pdf/products/monarch/Feb03_Report_Final.pdf>, 7 pages.

Blattner et al. "Special Edition Using Microsoft Excel 2000." Que Publishing. May 1999.

Kukich, Karen, "Knowledge-Based Report Generation: A Technique for Automatically Generating Natural Language Reports from Databases", 1983, ACM, pp. 246-250.

http://www.pcmag.com/article2/0,4149,101168,00.asp—Brown et al., "How to Print From A PDA," Dec. 5, 2000, 6 pages.

http://www.pcmag.com/article2/0,4149,193754,00.asp—Brown et al., "Quick PDA Data Exchange," May 22, 2001, 6 pages.

http://www.news.com.com/2100-1033-861812.html—Charny, "Data, Downloads and Microsoft," document stated to be last modified Mar. 18, 2002, 4 pages.

http://www.carchip.co.uk/downloads/dr_palm_download.pdf—"Palm Download Kit Installation Instructions," Printed from the Internet Oct. 20, 2003, 9 pages.

http://www.sfatek.com/cus.htm—"FAQ page," Printed from the Internet on Oct. 20, 2003, 5 pages.

Help menus for export operation in Microsoft® Outlook® 2000 SR-1 (9.0.0.3821), 7 pages.

Help menus for field copy operation in Microsoft® Outlook® 2000 SR-1 (9.0.0.3821), 6 pages.

Kiernan et al. , "Extending SQL-92 OODB Access: Design and Implementation Experience", ACM 1995, pp. 467-480.

United States Patent & Trademark Office, Final Office Action, U.S. Appl. No. 10/857,336, mailed Apr. 22, 2008 (27 pages).

United States Patent & Trademark Office, Non-Final Office Action, U.S. Appl. No. 10/857,336, mailed Jul. 25, 2007.

United States Patent & Trademark Office, Final Office Action, U.S. Appl. No. 10/857,336, mailed Jul. 10, 2009 (23 pages).

United States Patent & Trademark Office, Non-Final Office Action, U.S. Appl. No. 10/857,336, mailed Dec. 29, 2008 (21pages).

United States Patent & Trademark Office, Final Office Action, U.S. Appl. No. 10/698,089, mailed Jul. 10, 2008 (17 pages).

United States Patent & Trademark Office, Non-Non-Final Office Action, U.S. Appl. No. 10/698,089, mailed Aug. 24, 2007 (13 pages).

United States Patent & Trademark Office, Non-Final Office Action, U.S. Appl. No. 10/698,089, mailed Feb. 16, 2006 (18 pages).

United States Patent & Trademark Office, Non-Non-Final Office Action, U.S. Appl. No. 10/857,337, mailed Mar. 21, 2006 (11 pages).

United States Patent & Trademark Office, Final Office Action, U.S. Appl. No. 10/857,337, mailed Dec. 4, 2006 (12 pages).

Actuate Corporation. "e.Report Option." San Francisco, CA; 1995-2002. (7 pages).

European Official Action for Application No. EP 04 730 992.7-1238, dated Apr. 7, 2011, 6 pages.

"The Monarch Report: Feb. 2003." DataWatch Corporation, Lowell, MA; 2003(7 pages).

\* cited by examiner

US 8,589,311 B2

DESIGNING BUSINESS CONTENT FOR REPORTING

CROSS REFERENCE TO RELATED APPLICATIONS

This application claims priority from U.S. Provisional Application No. 60/478,255, filed Jun. 13, 2003, and titled "Designing Business Content, Reports, Charts and Instant Reports for Mobile Applications," which is incorporated by reference in its entirety.

TECHNICAL FIELD

The description relates to software applications for designing business content for reporting tools in electronic computing environments.

BACKGROUND

Businesses utilize electronic reports and charts to summarize information for presentation to clients, potential clients, internal management and development teams, etc. While several reporting tool software applications (e.g., Microsoft Excel, Microsoft Word and Seagate Crystal Reports) are currently available, software applications for designing and processing business content to be used by reporting tool applications are less prevalent.

One example of a software application that can be used to design business content for reports is based on business queries. The application requires a user (e.g., a business consultant) to code or model business queries, which represent information to be included in the report. That is, the user uses application programming (utilizing Visual Basic components, for example) to describe fields to be included in the report. A separate business query must be modeled for each reporting field. As such, it becomes tedious and time consuming to design business content to depict complicated business scenarios, and users need to be adept application programmers to effectively utilize the application.

SUMMARY

The invention provides techniques for designing business content for reporting tools. In one general aspect, the invention provides for receiving a user selection of a business object having associated attributes and displaying a view of the attributes associated with the selected business object. A user selection of one or more of the attributes is received, indicating the selected one or more attributes are to be displayed in a report generated in the external reporting application. The one or more selected attributes are added to a business content structure of selected attributes. Data associated with the business content structure is retrieved and an output file is generated. The external reporting application can use the output file to generate the report that includes the business content structure and the data associated therewith.

Implementations may include one or more of the following. A business content design wizard may assist in defining the business content structure. The business content structure may represent meta-data information. A view of a group of business content structures may be displayed and a user selection of one of the business content structures to be included in a report may be received.

In some embodiments, a view of a group of business objects each having associated attributes may be displayed, where each of the business objects has a defined relationship to the selected business object. Similarly, a view of the attributes for the group of related business objects may be displayed. A user selection of one or more of the attributes for the group of related business objects may be received, indicating that the selected one or more attributes are to be displayed in a report generated in the external reporting application. The selected one or more attributes may then be added to the business content structure of selected attributes.

A calculated field may be defined to be included in the business content structure. The calculated field may be associated with a function that takes one or more business object attributes as input, and uses a formula to compute a resultant value for the calculated field based on the input. The resultant value may then be included in the output file. The business content structure may be persistently stored in a database. In this case, the business content structure may be stored as an XML document in the database, and the business content structure attributes may correspond to tags in the XML document. The stored business content structure can later be retrieved and used to generate an output file that the external reporting application can use to generate the report with current data.

In another aspect, retrieving the data associated with the business content structure may involve constructing and filing at least one database query. In this case, the database query may be an SQL query that uses the concept of derived tables. The output file may be an ActiveX Data Object Recordset. Generating the output file that the external reporting application can use to generate the report may involve transferring the output file to a reporting-tool-specific interface component capable of plug-and-play interaction with the external reporting application.

Advantages of the invention may include one or more of the following. Object-based reports and charts may be efficiently designed without application programming or modeling using a software application that incorporates aspects of the invention. This permits a class of users who may not be adept application programmers to design business content for a report or chart to be generated in an external reporting tool application. Furthermore, even complicated business reports may be quickly and easily designed with the intuitive, easy-to-use interface, including the business content wizard. Performance may be increased because only data associated with selected object attributes need be retrieved from the database. Performance may further be increased using the derived table query concept, as fewer database accesses may be required. Because additional reporting tools can be supported without having to make coding changes to existing modules, system downtime can be minimized. Calculated fields add flexibility by allowing a user to include report content not ordinarily maintained in the system. Users can obtain reports having current data at the time of reporting by using previously designed stored business content structures.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Embodiments of the invention may be used to design business content for object-based reports or charts to be reported in an external general reporting application. The invention will be described in the context of a business content provider that is, in an embodiment, integrated into a software program application for mobile sales management. A mobile sales application can be used by mobile users (e.g., laptop or PDA users) to manage the interactions a company may have with its customers, for example, marketing, sales, and service functions. In other implementations, the business content provider may be integrated into other types of program applications (such as customer relationship management applications, supply chain management applications, or any other application where reporting is utilized), or may exist as an independent software program application.

Figure 1:
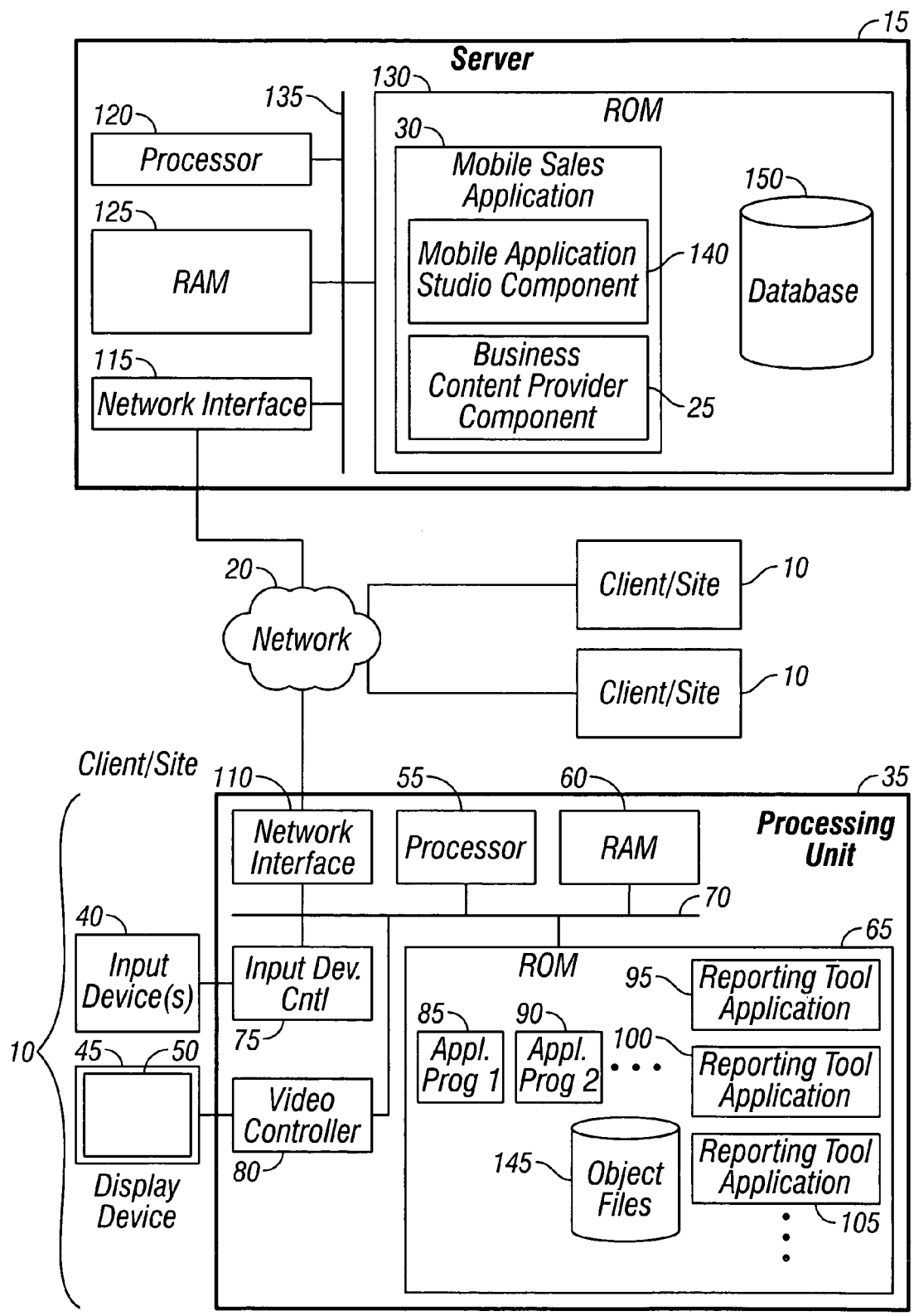
FIG. 1 is a block diagram of a system having a business content provider component that may utilize aspects of the invention.

Before discussing how the business content provider prepares content for reporting, it will be helpful to discuss an environment in which the business content provider may operate. FIG. 1 shows client site computer systems 10, a central server 15, and a network 20, over which the client computer systems 10 may communicate with the server 15. A business content provider component 25 is integrated into a mobile sales application 30, which resides on server 15 in this example. The business content provider component 25 can be used to design object-based report content for external reporting tools, and will be described in detail hereinbelow.

Moving now to client site computer system 10, the system includes a processing unit 35, one or more input devices 40, and a display device 45 upon which a user may be presented displays. The display device 45 has a video screen 50 upon which displays may appear. As is conventional, the processing unit 35 includes a processor 55, random access memory (RAM) 60, and read-only memory (ROM) 65, all interconnected by a system bus 70. Input device controllers 75, also connected to the system bus 70, receive command signals from input devices 40 and forward the command signals in the appropriate format for processing. A video controller 80, connected to the system bus 70, receives video command signals and generates the appropriate video signals that are forwarded to the display device 45 so that the desired display is provided on the screen 50. The computer system 10 is not limited to a personal computer such as a desktop or laptop, but could instead include a personal digital assistant (or other handheld computing device), a terminal, a workstation, or other such device. The client computer systems 10 could be mobile units at various sites in a sales region, for example.

ROM 65, as is conventional, provides non-volatile data storage including magnetic disk memory, flash memory, removable non-volatile storage media, and the like. Various application programs 85, 90, etc., as is conventional, have program instructions that may be loaded into RAM 60 during operation. Processor 55 then may execute the program instructions to perform desired program functions. ROM 65 further includes reporting tool applications 95, 100, 105, etc. The reporting tool applications may be generically applicable reporting tools, such as Microsoft Excel, Microsoft Word, Seagate Crystal Reports, etc. The reporting tool applications 95, 100, 105, etc., may receive the designed business content and generate reports for display on screen 50. The components just described could be combined or separated in various manners, and could be stored in various manners, such as on various non-volatile storage media.

Computer system 10 has a network interface 110 connected to its system bus 70, and to network 20. As such, computer system 10 may access server 15 via network 20 to run applications residing on the server 15. Network 20 may be, for example, a local area network (LAN), wide area network (WAN), or the Internet. Server 15 includes a network interface 115, one or more processors 120, RAM 125 and ROM 130, all interconnected by a bus 135. The server's network interface 115 provides the connection to network 20.

The server ROM 130 includes the mobile sales application 30, which includes the business content provider component 25 that can be used to design business content for report or chart generation, as will be described below. Mobile sales application 30 further includes a mobile application studio component 140 that can be used to create or model business queries, business objects and associated business object attributes, and to assign relationships between business objects. The business objects and/or business queries can be stored as files 145 within ROM 65 at client computer system 10, and may provide a basis for initializing a business content design. Server ROM 130, in this example, also includes data stored in database 150, although in other implementations separate databases or a separate database server may be used.

A user can use an input device 40, such as a mouse, keyboard, trackball, stylus, joystick, etc., to provide input and make selections that can affect application program operation. I/O devices such as a printer (not shown) can be used to print results. Devices such as memory controllers, power supplies, etc., are omitted for clarity. The components described with regard to FIG. 1 could be combined or separated in various manners. Any of the entities described above in client or server non-volatile memory 65 or 130 could alternatively be located in a separate server, database, or computer system, and could be stored on various non-volatile storage media.

In one implementation, the business content provider component 25 is made up of several different application program modules, some of which reside on a central server, such as server 15, while others reside on a client computer system, such as system 10. In other implementations, the business content provider component 25 can reside entirely on the server 15 (as depicted in FIG. 1), or entirely on the client computer system 10.

Figure 2:
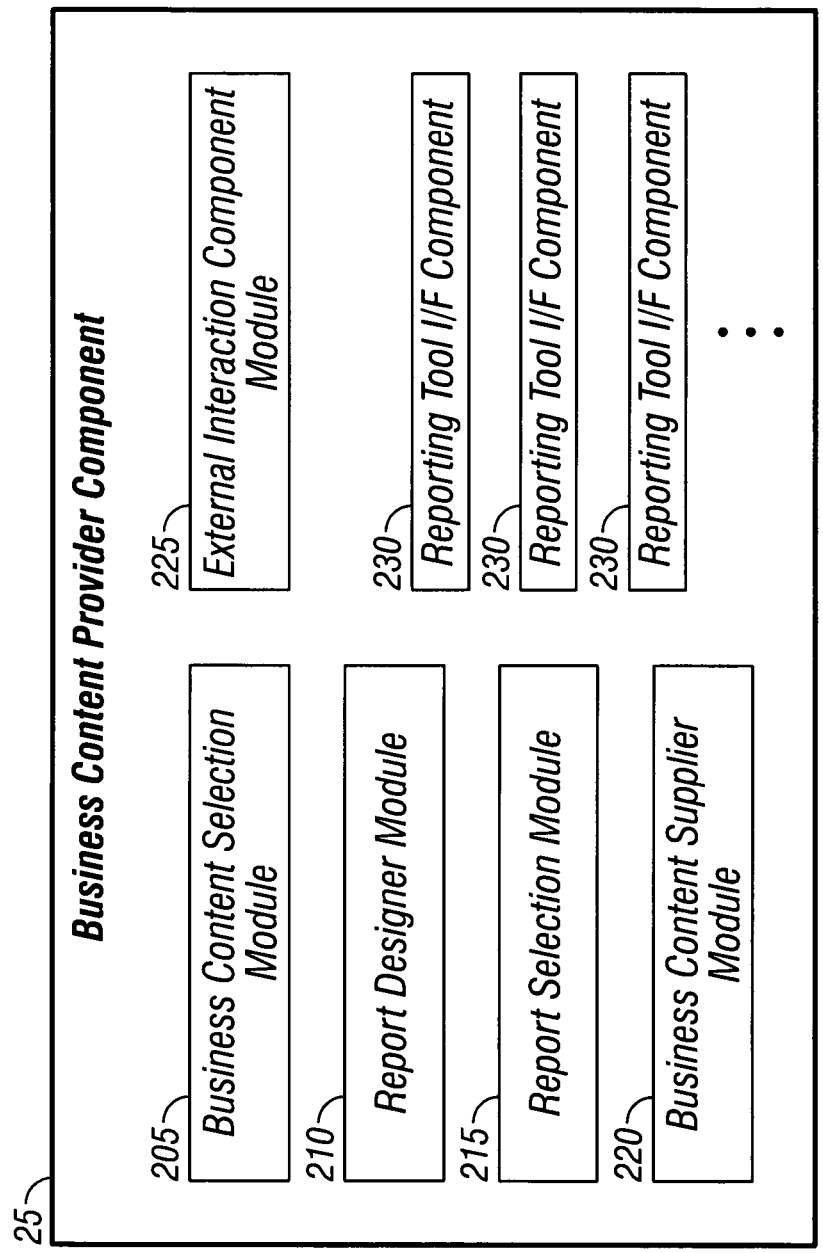
FIG. 2 is a conceptual depiction of the business content provider component from FIG. 1.

FIG. 2 shows the business content provider component 25 of FIG. 1, which is composed of several modules. A business content selection module 205 permits a user to define a business content structure of meta-data information for a report or chart. The business content structure specifies the content to be included in the report or chart, and can be persistently stored for later use in database 150, e.g., as an extension Markup Language (XML) document. The business content selection module 205 may provide an easy-to-use business content wizard to assist a user in defining business content for the business content structure.

A report designer module 210 can be used to specify a suitable reporting tool application (e.g., Microsoft Excel, Crystal Reports, etc.) and to define a layout that indicates where various sections will be located within the report or chart. A report selection module 215 may present a list of business content structures, from which a user may select a desired business content structure for reporting.

A business content supplier module 220 can then fetch the meta-data information and use it to construct queries to retrieve data associated with the meta-data information from the database 150. The business content supplier module 220 can then convert the meta-data information and associated data to a common data structure, such as an ActiveX Data Object (ADO) Recordset standard output format.

An external interaction component module 225 determines which reporting tool application will be used to generate the report or chart (e.g., by reading a reporting tool ID), and interacts with a corresponding reporting tool interface component 230. The external interaction component module 225 passes the common data structure to the appropriate reporting tool interface component 230, which then forwards it to the associated reporting application for report generation. An architecture including reporting-application-specific components, such as components 230, facilitates easy integration of external reporting tools. To add support for a new reporting tool application, a new interface component 230 is simply added to the business content provider component 25, without having to make coding changes to existing modules. This can minimize or eliminate the need for shutdown periods where the application is taken off-line for updates. The external interaction component module 225 and the reporting tool interface components 230 provide a plug-and-play interface, thus simplifying the process of adding and supporting new reporting tools. Referring again to FIG. 1, the reporting tool applications 95, 100, 105, etc., need not be pre-configured to operate with the business content provider component 25, thus expanding the universe of potential applications that might use generic reporting tool applications for report generation.

Generally, designing business content and delivering it to a reporting tool application can involve a design-time phase and a run-time phase. A user may use the business content selection module 205 and report designer module 210 during the design-time phase to define the content and layout of object-based reports or charts. The user may use the report selection module 215 during the run-time phase, during which the business content supplier module 220, external interaction component module 225 and reporting tool interface modules 230 may also be utilized. The user may be a human operator, a software application running without human intervention, or various combinations of both.

Object-based report design involves selecting business objects and associated business object attributes to be displayed in a report or chart. A business object may describe an entity to appear in a report (e.g., an object describing a business customer). Business object attributes are associated with the corresponding business object, and describe fields related to the object (e.g., contact person first name, contact person last name, etc.).

Figure 3:
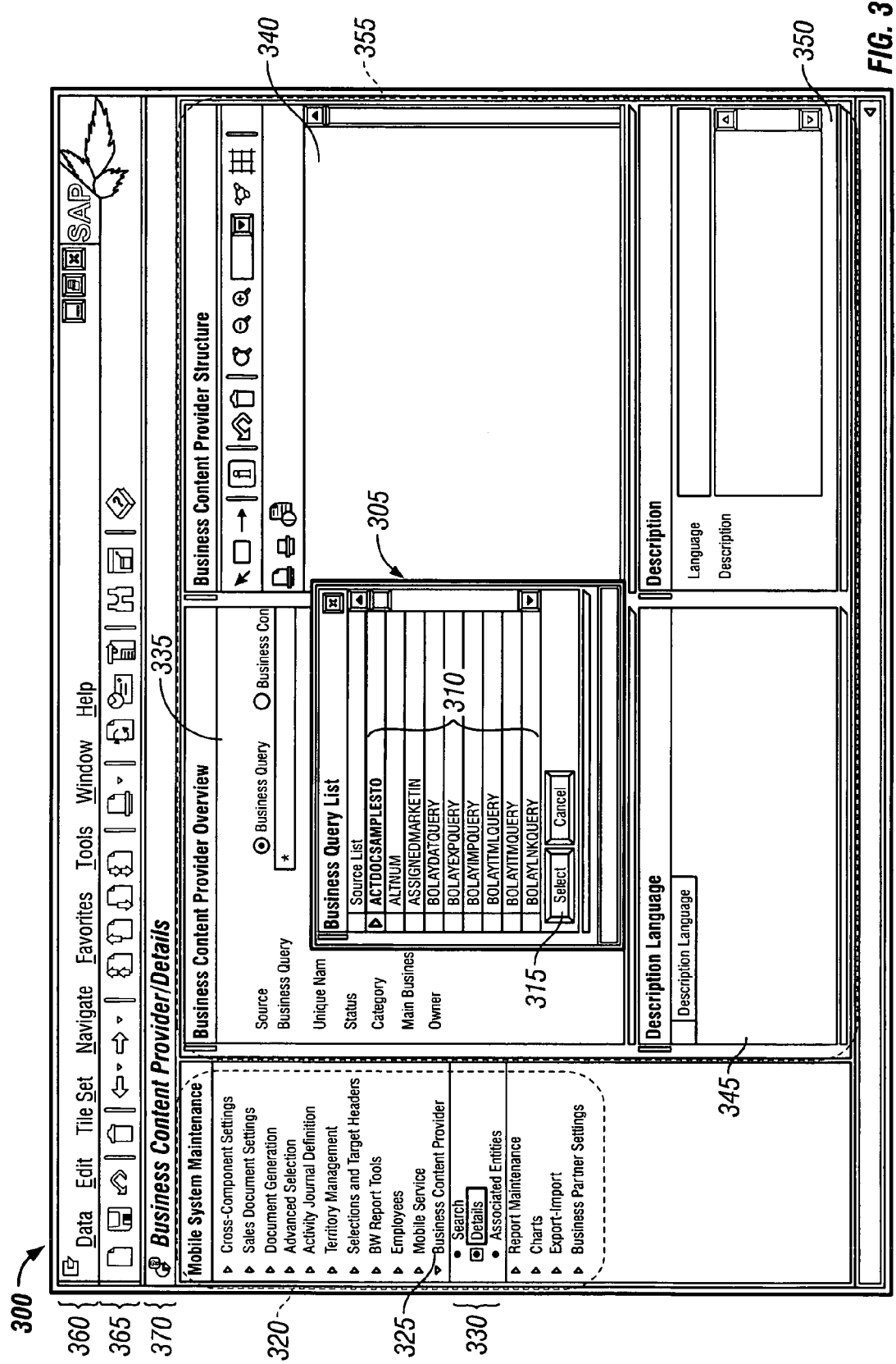
FIGS. 3-8 are screen snapshots of a computer display in accordance with embodiments of the invention.

In the following example, a user is using the business content provider component 25 to design business content for a report or chart to be generated by an external reporting tool. The user may wish to create a report or chart that describes recent sales orders, potential sales opportunities, or customer information, to list just a few examples. In this example, the user begins by selecting a previously modeled business object or business query. FIG. 3 shows an exemplary display 300 that may be presented, on screen 50 shown in FIG. 1, to the user of the business content provider component 25. A pop-up window 305 shows a group 310 of business queries, from which the user may select a desired business query (e.g., by using a mouse to click on a business query and then clicking on a "Select" button 315) to initiate a business content design. Business queries and/or business objects may comprise Visual Basic components stored locally as files, such as the files 145 stored on client computer 10. The business queries and/or business objects may have been previously designed using mobile application studio component 140, for example.

A collection 320 of selectable business entities, near a left edge of display 300 and labeled "Mobile System Maintenance," identifies various modes that the business content provider component 25 may operate in. In this example, a "Business Content Provider" business entity 325 is active, and includes a group 330 of three tile sets ("Search," "Details" (currently selected), and "Associated Entities"), each of which is associated with a group of tiles (that is, a group of views on the display, each of which may include a work area). The "Business Content Provider" entity 325 may be used to search for a previously modeled business object or business query and to design a business content structure for display in a report or chart.

The "Details" tile set includes four associated tiles shown in a content area 355 to the right of the collection 320 of business entities. Each tile has a title area and a work area. A "Business Content Provider Overview" tile 335 presents details of the current design and can be used to define a main business object for the business content structure. A "Business Content Provider Structure" tile 340 can display a pictorial view of business objects, and the relationships between them, that are included in the business content structure. A "Description Language" tile 345 can present a list of languages that the design is maintained in, and a "Description" tile 350 can be used to provide a description for the business content structure. A menu bar 360, toolbar 365 and title row 370 are located near the top of display 300.

Figure 4:
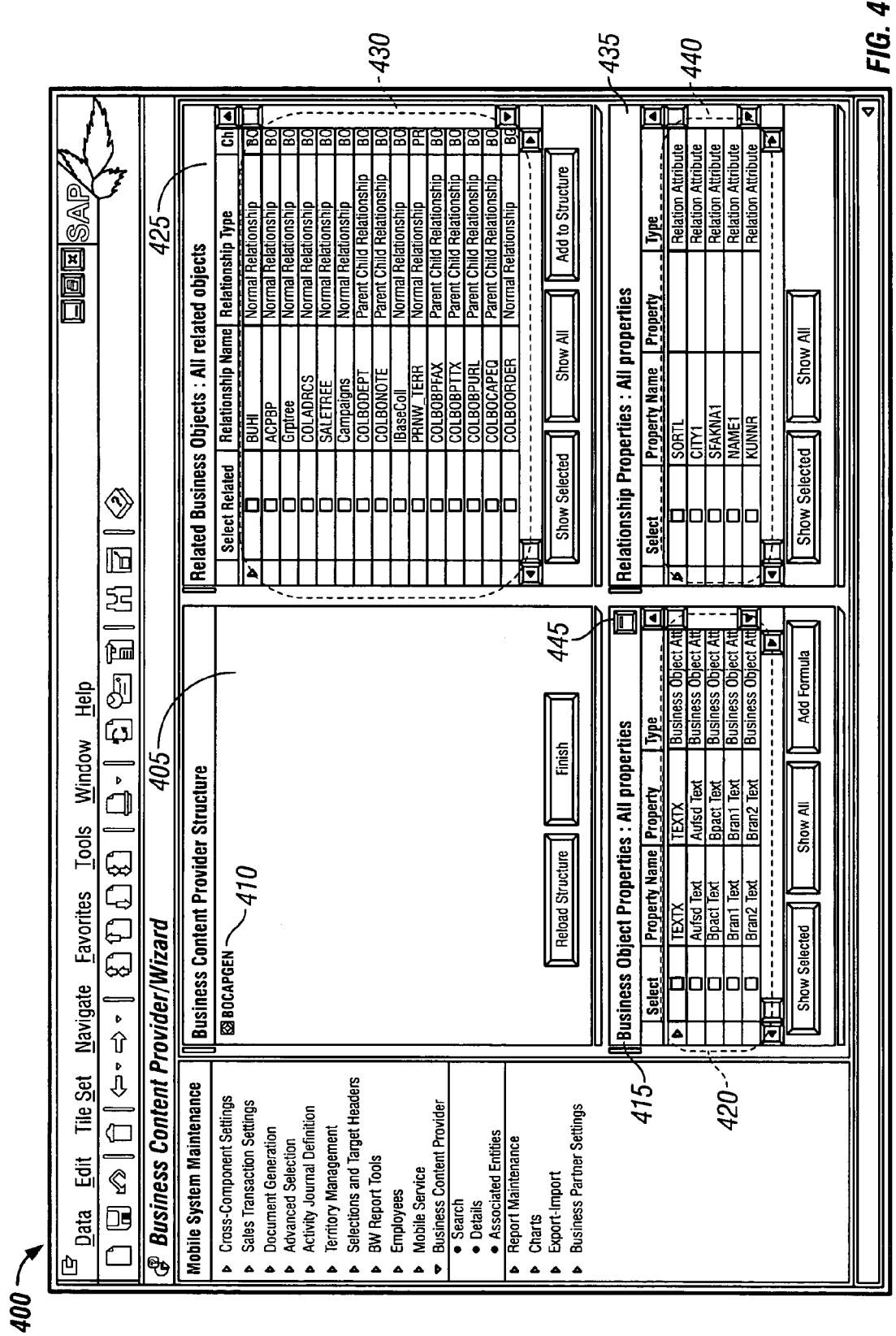

In the present example, suppose that the user locates and selects a "BSCAPGEN" business query (not shown) from the group 310 of business queries, and then selects the "Select" button 315. FIG. 4 shows a display 400 that may then be presented on screen 50. A "Business Content Provider Structure" tile 405 displays a "BOCAPGEN" business object 410. This object 410 represents the main business object for the current design. A "Business Object Properties: All properties" tile 415 includes a collection 420 of business object attributes, each of which is associated with, and may describe aspects of, the "BOCAPGEN" business object 410. From this tile 415, the user may select desired attributes to be included in the business content structure.

A "Related Business Objects: All related objects" tile 425 includes a collection 430 of business objects that are related to the main business object (BOCAPGEN 410). Because a user may typically be interested in including object information in the report that is related to the main business object, the structured presentation of related business objects provides easy access to these related objects and eliminates the need to search for the objects. A "Relationship Properties: All properties" tile 435 includes a group 440 of business object attributes associated with a selected business object in the "Related Business Objects: All related objects" tile 425. By displaying the main business object and its associated attributes 410 and 420, along with related business objects and their associated attributes 430 and 440, the business content provider component 25 provides the user with a convenient and flexible design environment, allowing business content structures to be quickly and easily designed. The user can efficiently design content for a report or chart without having to model business queries and/or write program code to describe the desired content. This permits users who may not be skilled in programming or coding to effectively design content for reports or charts using an object-based approach.

Figure 5:
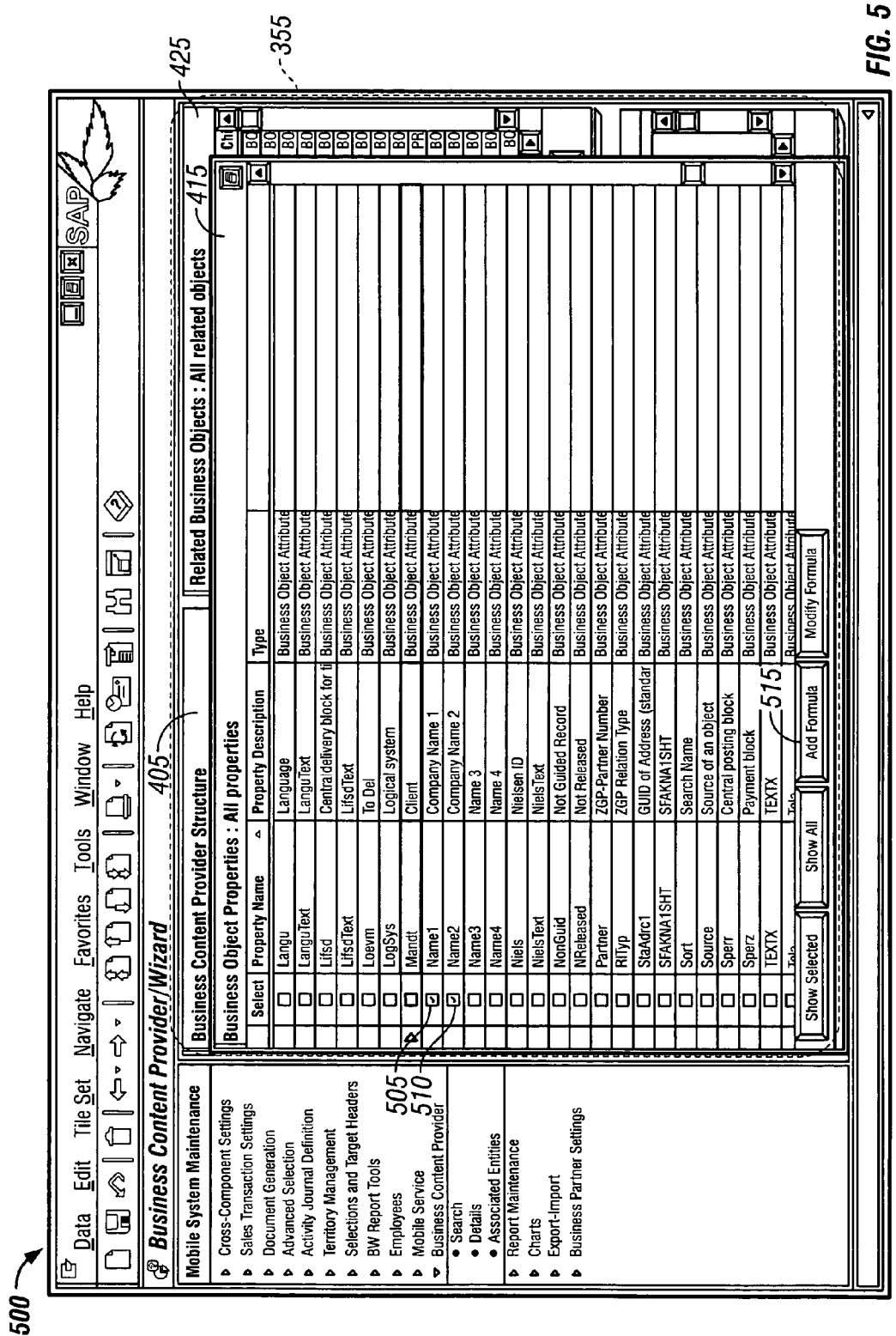

FIG. 5 shows a display 500 where the "Business Object Properties: All properties" tile 415 from FIG. 4 has been expanded (e.g., by selecting an expand button 445, shown in FIG. 4) to display more business object attributes. Here, the user has selected a "Name1" attribute 505 and a "Name2" attribute 510. These attributes 505 and 510 will be included in the business content structure and appear with corresponding data in the report or chart. Title areas of tiles 405 and 425 appear near the top of content area 355 in display 500.

A user may define related business objects with respect to the main business object, as will now be described with reference to FIG. 6. Display 600 presents a pop-up window 605 that includes a "Relationship Details" section 610 and a "Relationship Parameters" section 615. The "Relationship Details" section 610 includes input fields for specifying a relationship unique name 620 that may be unique to the business content structure, a relationship type 625, and a child business object 630. A relationship name field 635 lists a previously defined relationship name, using the mobile application studio component 140, for example. In this example, the related business object is "BOBPADDRESS," and may contain address information for the parent business object (BOCAPGEN). The "Relationship Parameters" section 615 lists parameters or properties that define the relationship between the main business object and the related business object. These properties can be used to obtain information on the related business object when searching the database 150 for associated data.

Figure 6:
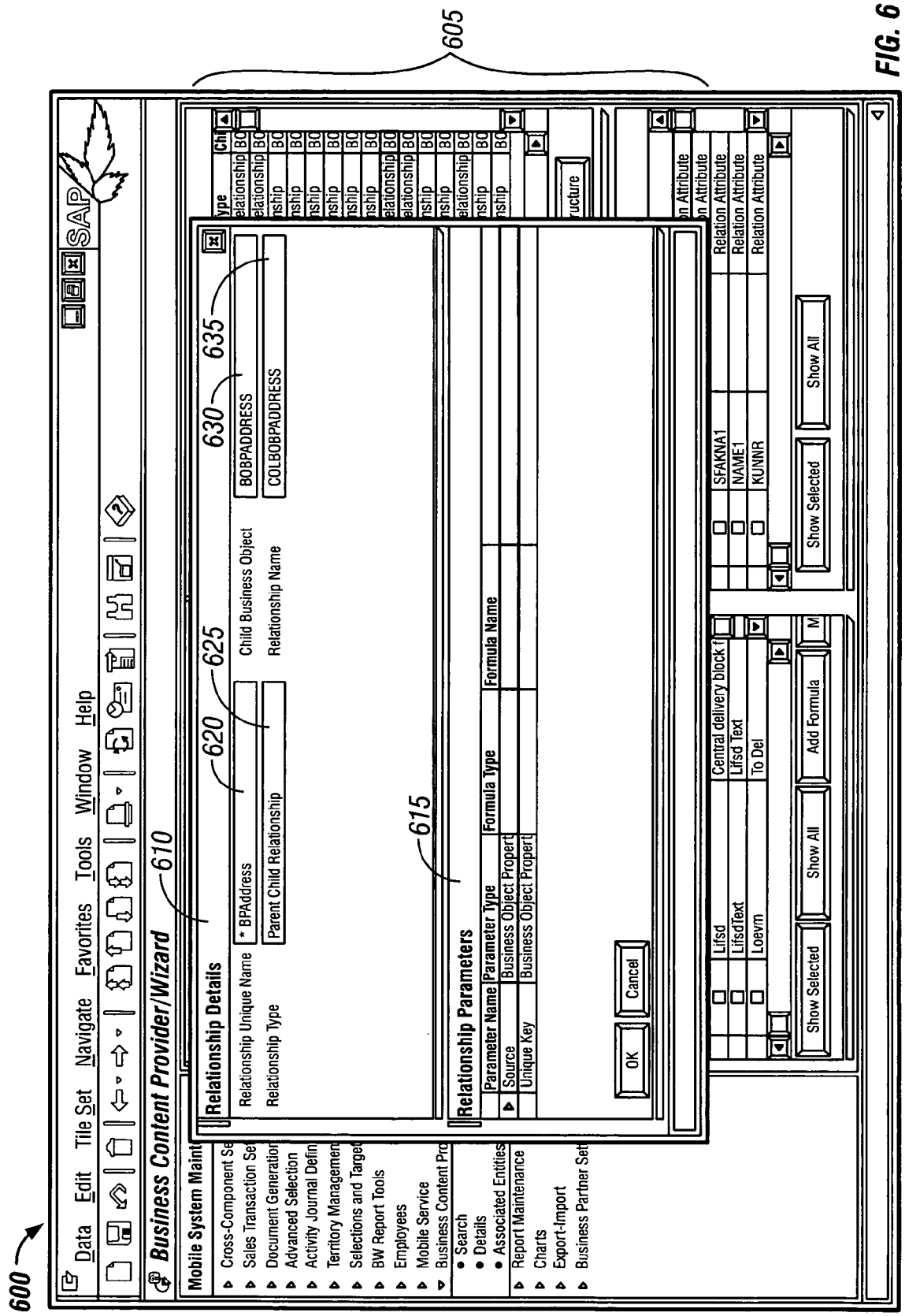
Figure 7:
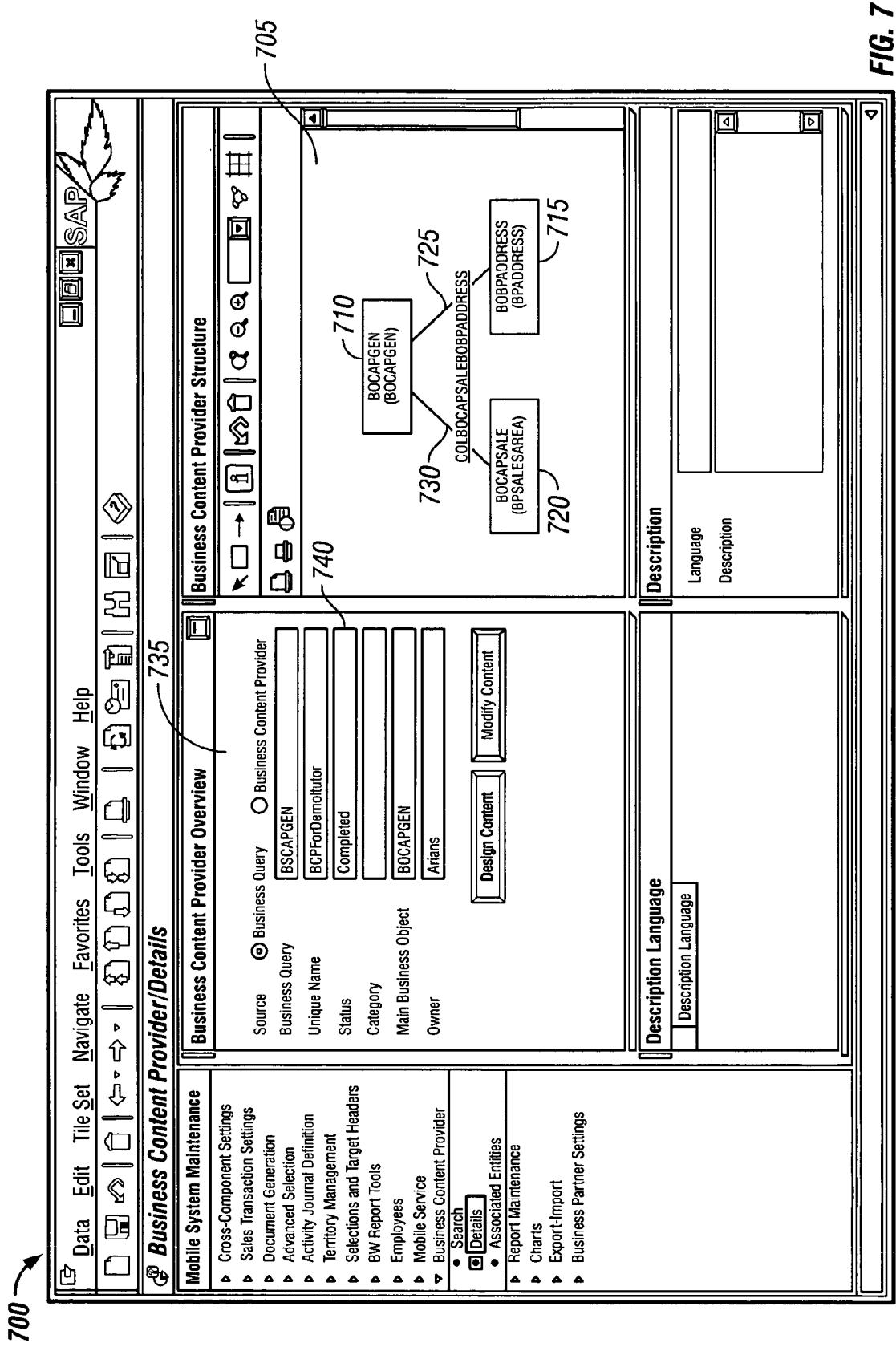

FIG. 7 shows a display 700 that includes a "Business Content Provider Structure" tile 705, which shows a pictorial representation of the main business object "BOCAPGEN" 710, and the related business object "BOBPADDRESS" 715 that was defined in display 600 (FIG. 6). Another related business object, "BOCAPSALE" 720, which may contain sales information for the parent business object (BOCAPGEN), is also shown. Each of the related business objects 715 and 720 are shown connected to the main business object 710 through connecting lines 725 and 730 (labeled "COLBOPADDRESS," and "COLBOCAPSALE"), respectively, which symbolize the relationships between the main object 710 and the related objects 715 and 720. A "Business Content Provider Overview" tile 735 summarizes the business content structure design, including a status field 740 (here, indicating a "Completed" status) that may indicate whether the current design is complete or in-progress, for example.

Figure 8:
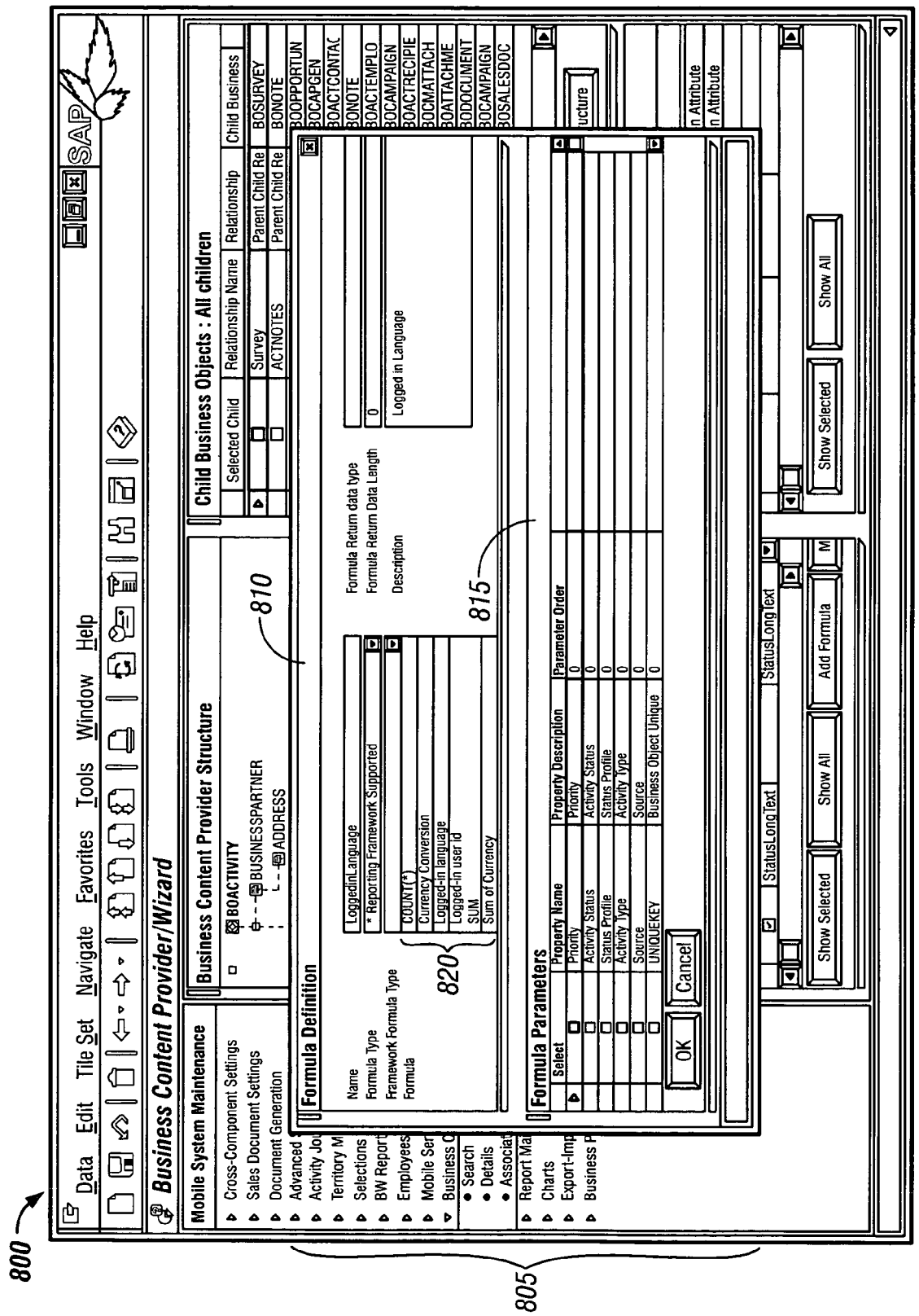

In addition to the previously defined business object attributes that are associated with a given business object, a user may also define a formula for a calculated field. This permits the user to define additional attributes to be included in the business content structure, and which will appear in the report or chart. Referring again to FIG. 5, an "Add Formula" button 515 may be selected, causing a display such as display 800, shown in FIG. 8, to appear on screen 50. Display 800 presents a pop-up window 805 that includes a "Formula Definition" section 810 and a "Formula Parameters" section 815. A drop-down list 820 of choices permits a user to select from a group of framework-supported formulas.

The formula may be a user-defined formula that accepts one or more parameters and returns a value. This provides flexibility and may be appropriate in situations where a user desires a report having attributes not previously defined and/or maintained. Currency conversion (e.g., when prices for sales items are maintained in euros, the user may wish to report the prices in U.S. dollars) and language translation are examples where formulas may be useful. The formula may be executed at run-time by the business content supplier module 220, for example, and the value may be transmitted to the reporting application along with the business content structure and the data. Alternatively, the formula may be a previously defined formula. The parameters may include data retrieved from a database, such as database 150, or from a user data dictionary, which may be appropriate for language conversion formulae.

The displays 400, 500, 600 and 800 shown in FIGS. 4-6 and 8 may be provided as part of a business content design wizard that can assist users in defining a business content structure to be displayed in a report or chart. The wizard may provide an easy-to-use and intuitive interface for designing content for reports, without requiring application programming.

Figure 9:
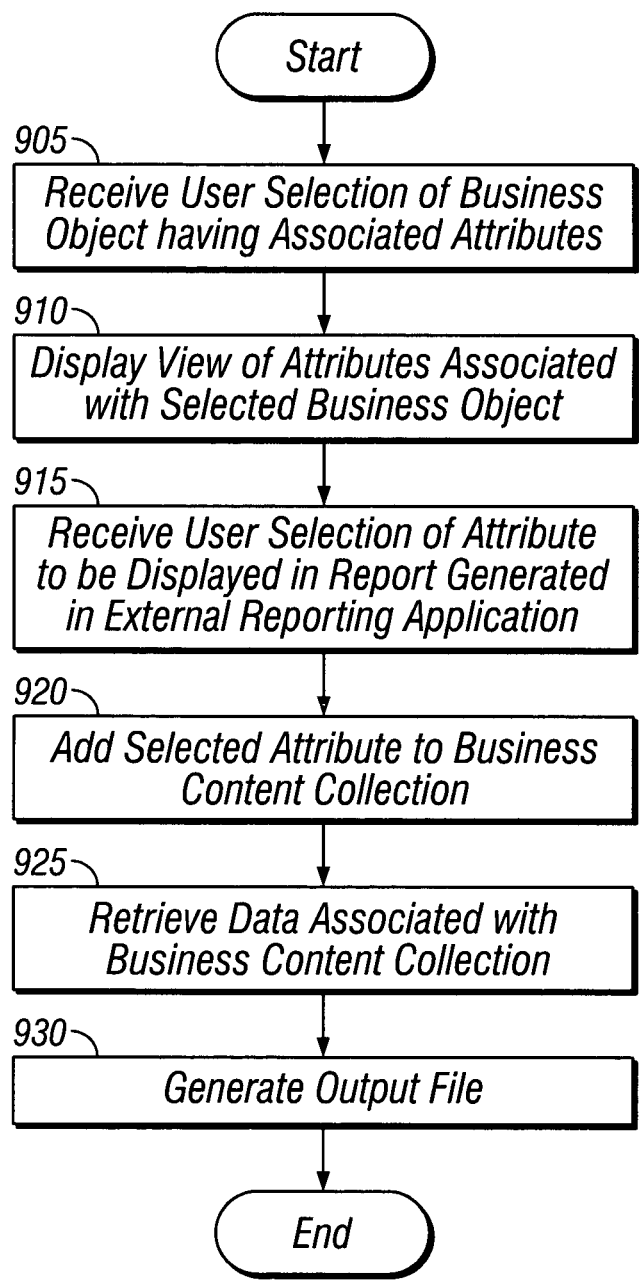
FIG. 9 is an exemplary flowchart illustrating an example of how the business content provider component of FIGS. 1-2 may operate.

The flowchart of FIG. 9 shows an example of a process that the business content provider component 25 may perform. For purposes of discussion, the following description references designing business content for reports; however, it applies to designing business content for charts as well. With reference to FIG. 9, a process begins, at step 905, with the receipt of a user selection a business object, such as business object 410, having associated business object attributes. The business object may include business queries, and may have been previously modeled and stored in memory. A search for a particular object or query may precede the user selection.

The process continues, at step 910, with displaying a view of business object attributes associated with the selected business object. The "Business Object Properties: All properties" tile 415 of FIG. 4 presents a collection 420 of business object attributes, each of which is associated with the "BOCAPGEN" business object 410. Next, at step 915, a user selection of at least one of the attributes is received, and the selected attribute is added to a business content structure of selected attributes (920). The selected attribute is to be displayed in a report generated in a general external reporting application. Attributes of related business objects, relationships between objects, and calculated fields can also be added to the business content structure.

The business content structure can be persistently stored in a database, such as database 150, for future use. This may permit a user to later select the business content structure and generate a report with current data at the time of reporting. In one implementation, the business content structure is stored as an XML document in the database 150, and each object attribute in the business content structure corresponds to a tag of the XML document. Layout information for the report, such as table-specific information defined using the report designer module 210, may also be stored in the XML document.

The process continues, at step 925, with retrieving data associated with the business content structure. This may involve first fetching the business content structure, interpreting the collection (for example, reading and interpreting the XML document in which the business content structure is stored), and constructing database queries for accessing the data. The database queries may be, for example, Structured Query Language (SQL) queries, and may utilize a derived table concept whereby fewer queries may be needed to retrieve data associated with related objects.

An output file is generated (930) for the external reporting application to use to generate the report. The output file includes business content structure information and the data associated therewith. Since only those business object attributes present in the business content structure (and not every attribute associated with a particular business object) will be included in the generated output file, performance may be improved. In one implementation, a standard output format such as an ActiveX Data Object (ADO) Recordset is generated.

The particular embodiments discussed above are merely illustrative, and may be modified and reconfigured readily in accordance with the teachings set forth herein. By way of non-limiting example, the business content structure need not be stored in a database, and instead may be directly used to generate an output file for the reporting tool application. Object files 145 could be stored on server 15, reporting tool applications 95, 100, 105, etc., could reside on server 15, and the FIG. 2 modules could be combined or separated in various manners, including existing separately from the business content provider component 25. In some implementations, the reporting tool application may be automatically launched, the output file transferred thereto, and the report generated therein. This may be facilitated by the corresponding reporting tool interface component 230.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of providing object-based content to be reported in an external computer-implemented general reporting application, the method comprising:

providing an electronic storage repository of business database objects from which object instances are able to be generated, which business database objects each have one or more attributes for which applicable data are able to be provided for a generated object instance;

receiving, in a data processing system comprising at least one computer, a user selection of one of the business database objects, wherein generated instances of the selected object have data for attributes of the object;

displaying on a display device a view that includes: i) the selected business database object in a first portion of the view, ii) at least some of the attributes associated with the selected business database object in a second portion of the view, iii) a plurality of business objects each having associated attributes, wherein each of the business objects has a defined relationship to the selected business database object in a third portion of the view, and iv) at least some of the attributes for the plurality of related business objects in a fourth portion of the view;

receiving in the data processing system a user selection of at least one of the displayed one or more attributes associated with the selected business database object, and a user selection of at least one of the displayed attributes for the plurality of related business objects, and adding the selected attributes to an electronic business content structure of selected attributes;

defining a report layout using the electronic business content structure and the selected attributes, wherein the report layout defines the structure of one or more reports;

executing a query of records in an electronic database and retrieving, for each of the records that meet the query, attribute data for each of the attributes in the electronic business content structure;

generating, in the data processing system and before reporting run-time, an output electronic file that the external computer-implemented reporting application can use to generate a report, the report to include the electronic business content structure and the attribute data associated therewith, and to be structured according to the report layout;

determining, at the reporting run-time, one of a plurality of external computer-implemented reporting applications for use in generating the report; and launching the determined reporting application using the output electronic file and generating the report in the determined reporting application according to the previously defined report layout.

2. The method of claim 1 wherein a business content design wizard assists in defining the electronic business content structure.

3. The method of claim 1 wherein the electronic business content structure represents meta-data information.

4. The method of claim 1 further comprising displaying on the display device a view of a plurality of electronic business content structures and receiving a user selection of one of the electronic business content structures to be included in a report.

5. The method of claim 1 further comprising defining a calculated field to be included in the electronic business content structure, wherein the calculated field is associated with a function that takes one or more business object attributes as input, and uses a formula to compute a resultant value for the calculated field based on the input.

6. The method of claim 5 wherein the electronic business content structure represents meta-data information.

7. The method of claim 5 wherein the resultant value is included in the output electronic file.

8. The method of claim 1 further comprising persistently storing the electronic business content structure in an electronic database.

9. The method of claim 8 wherein the electronic business content structure is stored as an XML document in the electronic database, and wherein the electronic business content structure attributes correspond to tags in the XML document.

10. The method of claim 1 wherein the database query is an SQL query that uses the concept of derived tables.

11. The method of claim 1 wherein the output electronic file is an ActiveX Data Object Recordset.

12. The method of claim 1 wherein generating the output electronic file that the external computer-implemented reporting application can use to generate the report further comprises transferring the output electronic file to a reporting-tool-specific interface component capable of plug-and-play interaction with the external computer-implemented reporting application.

13. A computer-implemented method of providing object-based content to be reported in an external computer-implemented general reporting application, the method comprising:

receiving, in a data processing system comprising at least one computer, a user selection of a business database object having associated attributes, wherein generated instances of the selected object have data for the associated attributes;

displaying on a display device a view that includes: i) the selected business database object in a first portion of the view, ii) at least some of the attributes associated with the selected business database object in a second portion of the view, iii) a plurality of business objects each having associated attributes, wherein each of the business objects has a defined relationship to the selected business database object in a third portion of the view, and iv) at least some of the attributes for the plurality of related business objects in a fourth portion of the view;

receiving in the data processing system a user selection of at least one of the displayed attributes associated with the selected business database object, and a user selection of at least one of the displayed attributes for the plurality of related business objects, and adding the selected attributes to an electronic business content structure of selected attributes;

persistently storing the electronic business content structure in an electronic database so that it can later be retrieved and used to generate, before reporting run-time, an output file that the external computer-implemented general reporting application can use to generate a report with current data; and defining a report layout using the electronic business content structure and the selected attributes, wherein the report layout defines the structure of one or more reports.

14. A non-transitory computer-readable medium with program instructions stored thereon that when executed perform the following functions for providing object-based content to be reported in an external computer-implemented general reporting application:

provides an electronic storage repository of business database objects from which object instances are able to be generated, which business database objects each have one or more attributes for which applicable data are able to be provided for a generated object instance;

receives, in a data processing system comprising at least one computer, a user selection of one of the business database objects, wherein generated instances of the selected object have data for attributes of the object;

displays on a display device a view that includes: i) the selected business database object in a first portion of the view, ii) at least some of the attributes associated with the selected business database object in a second portion of the view, iii) a plurality of business objects each having associated attributes, wherein each of the business objects has a defined relationship to the selected business database object in a third portion of the view, and iv) at least some of the attributes for the plurality of related business objects in a fourth portion of the view;

receives in the data processing system a user selection of at least one of the displayed one or more attributes associated with the selected business database object, and a user selection of at least one of the displayed attributes for the plurality of related business objects, and adding the selected attributes to an electronic business content structure of selected attributes;

defines a report layout using the electronic business content structure and the selected attributes, wherein the report layout defines the structure of one or more reports;

executes a query of records in an electronic database and retrieves, for each of the records that meet the query, attribute data for each of the attributes in the electronic business content structure;

generates, in the data processing system and before reporting run-time, an output electronic file that the external computer-implemented reporting application can use to generate a report, the report to include the electronic business content structure and the attribute data associated therewith, and to be structured according to the report layout;

determines, at the reporting run-time, one of a plurality of external computer-implemented reporting applications for use in generating the report; and launches the determined reporting application using the output electronic file and generates the report in the determined reporting application according to the previously defined report layout.

15. The medium of claim 14 wherein a business content design wizard assists in defining the electronic business content structure.

16. The medium of claim 14 wherein the electronic business content structure represents meta-data information.

17. The medium of claim 14 further comprising instructions that when executed displays on the display device a view of a plurality of electronic business content structures and receives a user selection of one of the electronic business content structures to be included in a report.

18. The medium of claim 14 further comprising instructions that when executed defines a calculated field to be included in the electronic business content structure, wherein the calculated field is associated with a function that takes one or more business object attributes as input, and uses a formula to compute a resultant value for the calculated field based on the input.

19. The medium of claim 18 wherein the electronic business content structure represents meta-data information.

20. The medium of claim 18 wherein the resultant value is included in the output electronic file.

21. The medium of claim 14 further comprising instructions that when executed persistently stores the electronic business content structure in an electronic database.

22. The medium of claim 21 wherein the electronic business content structure is stored as an XML document in the electronic database, and wherein the electronic business content structure attributes correspond to tags in the XML document.

23. The medium of claim 14 wherein the database query is an SQL query that uses the concept of derived tables.

24. The medium of claim 14 wherein the output electronic file is an ActiveX Data Object Recordset.

25. The medium of claim 14 wherein generating the output electronic file that the external computer-implemented reporting application can use to generate the report further comprises transferring the output electronic file to a reporting-tool-specific interface component capable of plug-and-play interaction with the external computer-implemented reporting application.

26. The method of claim 1, further comprising displaying a pictorial representation of the selected business database object and one or more of the related business objects.

27. The medium of claim 14, further comprising instructions that when executed display a pictorial representation of the selected business database object and one or more of the related business objects.

* * * * *